United States Patent [19]

Ogura et al.

[11] Patent Number: 5,700,859
[45] Date of Patent: Dec. 23, 1997

[54] AQUEOUS EMULSION OF FLUOROCARBON POLYMER AND METHOD FOR PRODUCING THE SAME

[75] Inventors: Masatsune Ogura, Ichikawa; Shizuo Chiba; Kayoko Ohtera, both of Shimizu, all of Japan

[73] Assignee: DuPont-Mitsui Fluorochemicals Co., Ltd., Tokyo, Japan

[21] Appl. No.: 596,234

[22] PCT Filed: Jul. 3, 1995

[86] PCT No.: PCT/JP95/01325

§ 371 Date: Feb. 16, 1996

§ 102(e) Date: Feb. 16, 1996

[87] PCT Pub. No.: WO96/01872

PCT Pub. Date: Jan. 25, 1996

[30] Foreign Application Priority Data

Jul. 11, 1994 [JP] Japan ............................. HEI 6-180480

[51] Int. Cl.$^6$ ................................................ C08J 3/00
[52] U.S. Cl. .................... 524/314; 524/377; 524/520; 524/544; 524/559; 525/326.2
[58] Field of Search .......................... 524/314, 377, 524/520, 544, 559; 525/326.2

[56] References Cited

U.S. PATENT DOCUMENTS

| 2,478,229 | 8/1949 | Berry | 524/546 |
| 4,369,266 | 1/1983 | Kuhes et al. | 524/546 |
| 5,010,121 | 4/1991 | Yeates et al. | 524/546 |

*Primary Examiner*—Vasu Jagannathan
*Assistant Examiner*—Olga Asinovsky
*Attorney, Agent, or Firm*—Cushman Darby & Cushman IP Group of Pillsbury Madison & Sutro LLP

[57] ABSTRACT

An aqueous emulsion of fluorocarbon polymer according to the present invention is characterized by that the emulsion comprises a sodium dialkylsulfosuccinic acid of not less than 1.5% by weight relative to the fluorocarbon polymer, and an alkyleneglycol. A method for producing a stabilized aqueous emulsions of fluorocarbon polymer according to the present invention comprises mixing an aqueous emulsion of fluorocarbon polymer obtained by an emulsion polymerization process with a sodium dialkylsulfosuccinic acid dissolved in an alkyleneglycol or an aqueous solution of the alkyleneglycol. A novel aqueous emulsion of fluorocarbon polymer having excellent mechanical stability and thermal stability is obtainable.

3 Claims, No Drawings

AQUEOUS EMULSION OF FLUOROCARBON POLYMER AND METHOD FOR PRODUCING THE SAME

This application claims benefit of international application PCT/JP 95/01325 filed Jul. 3, 1995.

TECHNICAL FIELD

The present invention relates to a novel aqueous emulsion of fluorocarbon polymer having excellent mechanical stability and thermal stability, and to a method for producing the same.

BACKGROUND ART

Aqueous emulsion of polytetrafluoroethylene (PTFE) are prepared by the emulsion-polymerization method disclosed in U.S. Pat. No. 2,559,752. In the method, tetrafluoroethylene is charged under pressure into an aqueous medium containing a water-soluble polymerization initiator and an anionic surfactant having a fluoroalkyl hydrophobic group to result in formation of colloidal particles of PTFE in the medium. The aqueous emulsion of other fluorocarbon polymers also are prepared by similar methods. The aqueous emulsion of fluorocarbon polymer thus prepared are stabilized by addition of emulsion stabilizers because of inferior mechanical stability of the emulsion itself.

For the emulsion stabilizer, hydrocarbon-base surfactants are employed usually in place of fluorocarbon-base surfactants mainly from the economical viewpoint, and commonly used emulsion stabilizers include such nonionic surfactants as p-$C_{8-10}$alkylphenylpolyethyleneglycolethers. However, emulsions thus stabilized by such surfactants are still not satisfactory in stability, and tend to turn into unstable ones by their encounter with mechanical actions during evaporation, concentration, dilution, transportation, weighing and others.

Anionic surfactants are also proposed for use as the emulsion stabilizer, and, for example, U.S. Pat. No. 4,369,266 mentions extensively such anionic surfactants as esters or salts of alkylsulfonic acids, alkylsulfuric acids, alkylarylsulfonic acids, alkylaryl sulfuric acids, higher fatty acids, alkyl phosphoric acid esters, alkylaryl phosphoric acid esters and sulfosuccinic acid. However, commercial usages of these surfactants for emulsion stabilizers are scarcely recognized, and further no mention is made in Examples of the U.S. Patent as to those anionic surfactants being used as emulsion stabilizers.

It is an object of the present invention to provide an aqueous emulsion of fluorocarbon polymer having excellent mechanical stability. By use of the present emulsion, for example, prevention becomes feasible against such problems caused by inferior mechanical stability as clogging of pumps, valves and nozzles with coagulated colloidal particles of fluorocarbon polymer formed during agitation, transportation and spraying, adhesion of coagulated particles to container walls and agitators, and flotation of coagulated particles in the emulsion. It is another object of the present invention to provide an aqueous emulsion of fluorocarbon polymer having excellent thermal stability. By use of the present emulsion, for example, prevention becomes feasible against such problems caused by inferior thermal stability as deteriorated coating and impregnation properties towards metals, glass woven fabric because of increased emulsion viscosities under high temperatures. It is a further object of the present invention to provide a method for producing efficiently in a short period of time an aqueous emulsion of fluorocarbon polymer having excellent mechanical and thermal stabilities.

For the purpose of obtaining aqueous emulsions of fluorocarbon polymer having excellent mechanical and thermal stabilities, the present inventors conducted numerous experiments using prospective surfactants including the aforementioned as the emulsion stabilizer. The result showed that most of the surfactants were not suitable due to causing, for example, inferior emulsion stability, excessive foaming of emulsion and coloration of coated glass woven fabric owing to surfactants, however, sodium salt of a specified alkylsulfosuccinic acid was found to be an effective emulsion stabilizer for a low content aqueous emulsion of fluorocarbon polymer. As the result of further studies, successful stabilization of aqueous emulsions of fluorocarbon polymer under their high content regions was obtained by use of sodium dialkylsulfosuccinic acids as the emulsion stabilizer to accomplish the present invention. Further, a method for producing efficiently aqueous emulsions of fluorocarbon polymer according to the present invention was achieved successfully.

DISCLOSURE OF THE INVENTION

An aqueous emulsion of fluorocarbon polymer according to the present invention is characterized by that the emulsion comprises a sodium dialkylsulfosuccinic acid of not less than 1.5% by weight relative to the fluorocarbon polymer, and an alkyleneglycol. A method for producing a stabilized aqueous emulsions of fluorocarbon polymer according to the present invention comprises mixing an aqueous emulsion of fluorocarbon polymer, obtained by an emulsion polymerization method with a sodium dialkylsulfosuccinic acid dissolved in an alkyleneglycol or an aqueous solution of the alkyleneglycol.

BEST MODE FOR CARRYING OUT THE INVENTION

In the present invention, the fluorocarbon polymer includes polymers of tetrafluoroethylene, chlorotrifluoroethylene or vinylidenefluoride, or copolymers containing the aforementioned. Mention is made of the polymers including PTFE, tetrafluoroethylene.hexafluoropropylene copolymer, tetrafluoroethylene.fluoroalkylvinylether copolymer, tetrafluoroethylene.ethylene copolymer, polychlorotrifluoroethylene, polyvinylidenefluoride and vinylidenefluoride.hexafluoropropylene copolymer.

In the present invention, the aqueous emulsion means those containing in water 1–75 wt % of the fluorocarbon polymer in colloidal particles having an average particle size of 0.1–0.3µ. The average particle size of colloidal particles is measured by the centrifugal sedimentation method. In the present invention, the values were measured by use of a centrifugal sedimentation particle size distribution measuring equipment (SA-CP4L; Shimadzu Corp.).

For the emulsion stabilizer, sodium dialkylsulfosuccinic acids are employed. The alkyl radical has 8–12 carbon atoms, and octyl or nonyl radical is specifically preferred. Such emulsion stabilizers were already employed for aqueous emulsions of PTFE, however, the concentrations of PTFE as well as of the emulsion stabilizer in the aqueous emulsion were quite low. For example, though U.S. Pat. No. 2,478,229 employs in Example 4 sodium dioctylsulfosuccinic acid which is the emulsion stabilizer of aqueous emulsions of the present invention, since the concentration of PTFE emulsion is so low as 3.2 wt % and 1 wt % solution of the above emulsion stabilizer is added thereto, the concentration of resulting stabilized emulsion is lowered further to 2.78 wt %. That is, it was a problem to require quite a long period of time to obtain a concentrated aqueous PTFE emulsion by adding directly the emulsion stabilizer to the aqueous emulsion for stabilization thereof, as the solubility to water of this kind of emulsion stabilizers is so low as around 1.5% that it takes a too long time for dissolution of the stabilizer into emulsion to achieve stabilization of the emulsion. Accordingly, it was difficult to prepare industrially concentrated aqueous PTFE emulsions having a concentration larger than 10 wt %.

For preparing in a short period of time a stabilized concentrated aqueous PTFE emulsion, the present inventors have found it effective to mix an aqueous PTFE emulsion with a sodium dialkylsulfosuccinic acid dissolved beforehand in an alkyleneglycol especially in ethyleneglycol or propyleneglycol or in an aqueous alkyleneglycol solution. In the above, the alkyleneglycol serves for sodium dialkylsulfosuccinic acids as a solubilizer towards water. On the other hand, when carbon tetrachloride, petroleum ether, naphtha, xylene, petroleum-base solvents, acetone, alcohols, etc. known as organic solvents for sodium dialkylsulfosuccinic acids were used as the solubilizer, the resulting aqueous PTFE emulsions were unstable.

The amount of sodium dialkylsulfosuccinic acid added is not less than 1.5%, preferably 2–5%, by weight of the fluorocarbon polymer. When the amount is less than 1.5%, the emulsion tends to become unstable. No specific upper limit exists for the amount, however, an amount over 5% is uneconomical. The amount of alkyleneglycol is so settled as to improve the solubility of sodium dialkylsulfosuccinic acid in water but be not too much to render the aqueous emulsion of fluorocarbon polymer unstable. The more the amount of alkyleneglycol, the more the solubility of sodium dialkylsulfosuccinic acid in water is improved, however, too much amount makes the aqueous emulsion of fluorocarbon polymer unstable. Thus, the amount of alkyleneglycol added is not more than 10%, preferably not more than 5%, by weight of the fluorocarbon polymer. No specific lower limit exists for the amount of alkyleneglycol, however, an amount over 1%, preferably over 5%, more preferably over 10%, by weight of the sodium dialkylsulfosuccinic acid is recommended.

In the method for producing the aqueous emulsion of fluorocarbon polymer, it is important to provide beforehand a solution of sodium dialkylsulfosuccinic acid in an alkyleneglycol or its aqueous solution, and to mix the solution with an aqueous fluorocarbon polymer emulsion to obtain an emulsion according to the present invention. If the sodium dialkylsulfosuccinic acid is firstly mixed with an aqueous fluorocarbon polymer emulsion and then an alkyleneglycol is added, or is mixed with a mixture of an aqueous fluorocarbon polymer emulsion and an alkyleneglycol, the sodium dialkylsulfosuccinic acid encounters with difficulty in dissolving into the mixture.

The mechanical stability of the aqueous emulsion of fluorocarbon polymer can be assessed by observation of increased ratio of apparent sizes of associated colloidal particles resulting from collisions of particles in the emulsion during high speed agitation of the emulsion. Further, under agitation, the colloidal particles coagulate partly to form a coagulum, which may adhere to agitator rotors, vessel walls and others, or isolate from the emulsion as a flock. Under occurrence of these phenomenon, the emulsion is regarded as having an inferior stability, despite of the increase or decrease in size of colloidal particles remaining in the emulsion. In the present invention, the mechanical stability is assessed by increased ratio of particle size measured according to the following method. Into a beaker of 60 mm inner diameter is charged 200 ml of an emulsion having an average particle size ($S_1$). An agitator (ULTRA-TURRAX; JUNKE & KUNKEL GMBH & Co. KG) having a shaft with a generator is so put in the beaker as the shaft is apart by 15 mm from the bottom of beaker and deviates by 5 mm from the center, and the agitator is operated for 5 minutes under 20,500 rpm. The average particle size ($S_2$) of emulsion after being subjected to the agitation is measured, and the increased ratio of particle size is calculated according to the following formula:

Increased ratio of particle size (%)=($S_2$-$S_1$)/$S_1$33 100

The mechanical stability is rated under the following standard:

Good: Increased ratio of particle size is >0%–<5%;

Fair: Increased ratio of particle size is ≧5% –<10%; and

Poor: Increased ratio of particle size is ≧10%.

In addition to the above, Poor is rated when a large amount of coagulated matter is formed by the agitation.

Viscosity of the aqueous emulsion increases in accordance with increase in the temperature of emulsion. Unfavorable emulsions show sharp increase in viscosity at 30°–50° C. the emulsions encounter when stored in summer. In the present invention, the viscosity was measured at 20°–60° C. for aqueous emulsions containing about 60 wt % fluorocarbon polymer by use of a B-Type viscometer (Type BL; Tokyo Keiki). Emulsions showing vigorous increases in viscosity at 30°–50° C. are recognized as having poor thermal stability.

Examples of the aqueous emulsion of fluorocarbon polymer will be explained hereunder, in which aqueous emulsions of PTFE were employed as the emulsion since they were regarded as the most difficultly stabilized.

[Example 1]

Mechanical Stability Test: To 300 ml of an aqueous emulsion containing about 45wt % PTFE , obtained by the emulsion polymerization method was added sodium dioctylsulfosuccinic acid dissolved in 50wt% aqueous solution of propyleneglycol by amounts mentioned in Table 1, and the resulted mixture was stirred (100 rpm) in a 500 ml beaker for 5 min under addition of water to prepare 30 wt % PTFE aqueous emulsion sample A. The sample was subjected to the measurement of increased ratio of particle size according to the method mentioned previously. The result shown in Table 1 indicates that the increased ratio of particle size was quite small.

TABLE 1

| Sample | sodium dioctyl sulfo- succinic acid (wt % per PTFE) | aqueous solution of propyleneglycol | | average particle size | | increased ratio of |
|---|---|---|---|---|---|---|
| | | propylene glycol (wt % per) PTFE) | water (wt % per PTFE) | before agitation ($\mu$) | after agitation ($\mu$) | average particle size (%) |
| A (Example) | 3.0 | 0.5 | 0.5 | 0.238 | 0.241 | 1.3 |

[Example 2]

Mechanical Stability Test: To 300 ml of an aqueous emulsion containing about 45 wt % PTFE , obtained by the emulsion polymerization method was added sodium dioctylsulfosuccinic acid dissolved in an alkyleneglycol by amounts mentioned in Table 2, and the resulted mixture was stirred (100 rpm) in a 500 ml beaker for 5 min under addition of water to prepare 30wt % PTFE aqueous emulsion samples B, C, D and E. Each sample was subjected to the measurement of increased ratio of particle size according to the method mentioned previously. The result is shown in Table 2.

[Comparative Example 1]

Samples F and G were prepared in the same manner as Example 1 except for using kerosene or alcohols as the solvent for sodium dioctylsulfosuccinic acid, and the increased ratio of particle size was measured. The result is shown in Table 2.

As understandable from Table 2, samples B-E containing sodium dioctylsulfosuccinic acid and alkyleneglycol show smaller increased ratio of particle size for the PTFE aqueous emulsions than those of samples F and G using kerosene or alcohols as solvent for the salt, which indicates an improved mechanical stability is obtainable.

TABLE 2

| Sample | sodium dioctyl sulfo- succinic acid (wt % per PTFE) | propylene glycol (wt % per PTFE) | ethylene glycol (wt % per PTFE) | average particle size before agita- tion (μ) | average particle size after agita- tion (μ) | increased ratio of average particle size (%) |
|---|---|---|---|---|---|---|
| B (Example) | 3.0 | 1.0 | — | 0.220 | 0.223 | 1.4 |
| C (Example) | 3.0 | 3.0 | — | 0.224 | 0.228 | 1.8 |
| D (Example) | 3.0 | 0.5 | 1.0 | 0.229 | 0.231 | 0.9 |
| E (Example) | 3.0 | — | 3.0 | 0.227 | 0.233 | 2.6 |
| F (Comp. Example) | 3.0 | kerosene | 2.0 | 0.233 | 0.251 | 7.7 |
| G (Comp. Example) | 3.0 | isopropanol methanol | 1.5 1.5 | 0.233 | unmeasurable (coagulation) | |

[Comparative Example 2]

Except that reagent grade sodium dioctylsulfosuccinic acid powder (no addition of alkyleneglycol) was added by 3.0% by weight of PTFE to an aqueous emulsion containing about 45 wt % PTFE, obtained by the emulsion polymerization method and that the period of time for stirring (100 rpm) was altered, 30 wt % aqueous PTFE emulsions were prepared in the same manner as the Examples. Measurements of increased ratio of particle size were conducted for the samples having stirring period of 0.5, 1, 3 and 8 hr, and the result is shown in Table 3. In the mechanical stability test, the sample having 0.5 hr stirring showed coagulation, samples having 1 hr and 3 hr stirring were inferior to Examples of the invention and only the sample having 8 hr stirring showed equal result.

TABLE 3

| Sample | stirring period (hr) | average particle size before agita- tion (μ) | average particle size after agita- tion (μ) | increased ratio of average particle size (%) |
|---|---|---|---|---|
| H (Comp. Example) | 0.5 | 0.234 | unmeasurable (coagulation) | |
| I (Comp. Example) | 1 | 0.234 | 0.247 | 5.6 |
| J (Comp. Example) | 3 | 0.234 | 0.241 | 3.0 |

TABLE 3-continued

| Sample | stirring period (hr) | average particle size before agita- tion (μ) | average particle size after agita- tion (μ) | increased ratio of average particle size (%) |
|---|---|---|---|---|
| K (Comp. Example) | 8 | 0.234 | 0.236 | 0.9 |

[Example 3 and Comparative Example 3]

Sample L prepared by concentrating Sample A to 59.1 wt % content, and sample M being 60 wt % PTFE aqueous emulsion containing p-nonylphenylpolyethyleneglycolether (poly=9) by 3.0% by weight of PTFE were subjected to the thermal stability test, and the result is shown in Table 4. Sample M shows a rapid increase in viscosity at above 40° C., but sample L being an example of the invention does a slow increase. Increased particle size for each sample was 3.4% and 5.4% respectively.

TABLE 4

| Sample | kind of emulsion stabilizer | Viscosity (cP) | | | | |
|---|---|---|---|---|---|---|
| | | 20° C. | 30° C. | 40° C. | 50° C. | 60° C. |
| L (Example) | sodium dioctylsulfo-succinic acid | 22.5 | 25.2 | 25.8 | 31.7 | 34.6 |
| M (Comp. Example) | p-nonyl-phenyl poly-ethylene-glycol ether (poly = 9) | 22.5 | 21.5 | 22.5 | 56.0 | 97.0 |

[Example 4 and Comparative Example 4]

Samples of 30% PTFE aqueous emulsion N, O, P, Q and R containing different amount of sodium dioctylsulfosuccinic acid as mentioned in Table 5 were prepared in a similar manner as that of Example 1, and the increased ratio of particle size was measured. The result is shown in Table 5. The sample containing sodium dioctylsulfosuccinic acid by 0.5%(Q) or 1%(R) shows coagulation of the emulsion.

TABLE 5

| Sample | sodium dioctyl sulfo-succinic acid (wt % per PTFE) | propylene glycol (wt % per PTFE) | average particle size | | increased ratio of average particle size (%) |
|---|---|---|---|---|---|
| | | | before agita-tion (μ) | after agita-tion (μ) | |
| N (Example) | 3.0 | 3.0 | 0.224 | 0.228 | 1.8 |
| O (Example) | 2.2 | 0.4 | 0.224 | 0.225 | 0.9 |
| P (Example) | 1.5 | 0.3 | 0.232 | 0.238 | 2.6 |
| Q (Comp. Example) | 1.0 | 0.2 | 0.232 | unmeasurable (coagulation) | |
| R (Comp. Example) | 0.5 | 0.1 | 0.232 | unmeasurable (coagulation) | |

[Example 5]

Samples S, T, U and V were prepared by diluting 30% PTFE aqueous emulsions N and O shown in Table 5 with water by 10 or 30 times, and the increased ratio of particle size for the diluted samples were measured. The result is mentioned in Table 6. Aqueous emulsions N and O show small increased ratios of particle size and good mechanical stability without concern in the degree of dilution with water.

TABLE 6

| Sample | sodium dioctyl sulfo-succinic acid (wt % per PTFE) | propylene glycol (wt % per PTFE) | dilution ratio | average particle size | | increased ratio of average particle size (%) |
|---|---|---|---|---|---|---|
| | | | | before agita-tion (μ) | after agita-tion (μ) | |
| S (Example) | 3.0 | 3.0 | 10 | 0.226 | 0.230 | 1.8 |
| T (Example) | 3.0 | 3.0 | 30 | 0.224 | 0.225 | 0.9 |
| U (Example) | 2.2 | 0.4 | 10 | 0.224 | 0.224 | 0.0 |
| V (Example) | 2.2 | 0.4 | 30 | 0.223 | 0.225 | 0.9 |

INDUSTRIAL APPLICABILITY

Thanks to the present invention, it has become possible to produce efficiently in a short period of time PTFE aqueous emulsions having superior mechanical stability and thermal stability. By use of such superior properties of fluorocarbon resins exhibited in the surface property, heat resistance, chemical resistance and electrical property, the aqueous emulsions of fluorocarbon polymer according to the present invention are employed as coating agents for metals or the like, impregnating agents for fibers and cloths, additives for various materials including such thermoplastics as polycarbonate to make them flame retardant, and further as dust-preventive treating agents. In the application field of aqueous emulsion of fluorocarbon polymer, there were tendencies due to insufficient mechanical and thermal stability of the emulsion that the emulsion became unstable during evaporation, concentration, dilution, transportation, weighing in the production process and during coating, impregnation, mixing in the application process, which were serious problems to be solved. Though it was difficult to obtain efficiently in a short period of time aqueous emulsions of fluorocarbon polymer having commercially sufficient stability, the present invention achieved to provide an aqueous emulsion of fluorocarbon polymer capable of solving these problems, and further a method for producing the emulsion.

What is claimed is:

1. An aqueous emulsion of fluorocarbon polymer comprising:

a fluorocarbon polymer selected from the group consisting of polymers of tetrafluoroethylene, chlorotrifluoroethylene and vinylidenefluoride, or a fluorocarbon copolymer selected from the group consisting of tetrafluoroethylene.hexafluoropropylene copolymer, tetrafluoroethylene.fluoroalkylvinylether copolymer, tetrafluoroethylene.ethylene copolymer, polychlorotrifluoroethylene.hexafluoropropylene copolymer, polyvinylidenefluoride.hexafluoropropylene copolymer, end vinylidenefluoride.hexafluoropropylene copolymer;

sodium dialkylsulfosuccinic acid of not less than 1.5% by weight relative to the fluorocarbon polymer; and an alkyleneglycol.

2. An aqueous emulsion of fluorocarbon polymer according to claim 1, in which the content of alkyleneglycol is not less than 1% by weight relative to the sodium dialkylsulfosuccinic acid.

3. A method for producing stabilized aqueous emulsions of fluorocarbon polymer, wherein said method comprising:

a step of mixing aqueous emulsions of a fluorocarbon polymer obtained by an emulsion polymerization process with a sodium dialkylsulfosuccinic acid dissolved in an alkyleneglycol or an aqueous solution of the alkyleneglycol, said fluorocarbon polymer or copolymers thereof being selected from the group consisting of polymers of tetrafluoroethylene, chlorotrifluoroethylene and vinylidenefluoride, and a fluorocarbon copolymer selected from the group consisting of tetrafluoroethylene.hexafluoropropylene copolymer, tetrafluoroethylene.fluoroalkylvinylether copolymer, tetrafluoroethylene.ethylene copolymer, polychlorotrifluoroethylene.hexafluoropropylene copolymer, polyvinylidenefluoride.hexafluoropropylene copolymer, and vinylidenefluoride.hexafluoropropylene copolymer.

* * * * *